(12) United States Patent
Krimer et al.

(10) Patent No.: US 8,812,823 B2
(45) Date of Patent: *Aug. 19, 2014

(54) MEMORY DISAMBIGUATION TECHNIQUES USING COUNTER RATIO TO SELECTIVELY DISABLE LOAD/STORE CONFLICT PREDICTION

(75) Inventors: Evgeni Krimer, Eilat (IL); Guillermo Savransky, Haifa (IL); Idan Mondjak, Karmiel (IL); Jacob Doweck, Haifa (IL)

(73) Assignee: Intel Corporation, Santa Clara, CA (US)

( * ) Notice: Subject to any disclaimer, the term of this patent is extended or adjusted under 35 U.S.C. 154(b) by 514 days.

This patent is subject to a terminal disclaimer.

(21) Appl. No.: 12/460,222

(22) Filed: Jul. 14, 2009

(65) Prior Publication Data

US 2009/0282202 A1 Nov. 12, 2009

Related U.S. Application Data

(63) Continuation of application No. 11/370,723, filed on Mar. 7, 2006, now Pat. No. 7,590,825.

(51) Int. Cl.
*G06F 9/00* (2006.01)
*G06F 9/38* (2006.01)

(52) U.S. Cl.
CPC .................. *G06F 9/3838* (2013.01)
USPC ........................................ 712/216

(58) Field of Classification Search
CPC ................................. G06F 9/3838
USPC .............. 712/214, 216, 217, 218, 225
See application file for complete search history.

(56) References Cited

U.S. PATENT DOCUMENTS

| | | |
|---|---|---|
| 5,615,350 A | 3/1997 | Hesson et al. |
| 5,666,506 A | 9/1997 | Hesson et al. |
| 5,715,421 A | 2/1998 | Akiyama et al. |
| 5,780,580 A | 7/1998 | Shalaby et al. |
| 5,781,752 A | 7/1998 | Moshovos et al. |
| 5,799,165 A | 8/1998 | Favor et al. |
| 5,884,061 A | 3/1999 | Hesson et al. |

(Continued)

FOREIGN PATENT DOCUMENTS

| | | |
|---|---|---|
| EP | 0586057 | 3/1994 |
| JP | 60129839 | 7/1985 |

(Continued)

OTHER PUBLICATIONS

Espasa, Roger, et al. "Tarantula: A Vector Extension to the Alpha Architecture," (2002) In Proceedings of the 29th International Symposium on Computer Architecture; 12 pages.

(Continued)

*Primary Examiner* — David J Huisman
(74) *Attorney, Agent, or Firm* — Mnemoglphics, LLC; Lawrence M. Mennemeier

(57) ABSTRACT

A memory access management technique is disclosed, one embodiment of which relates to a technique to issue loads to a memory ahead of older store operations corresponding to the same target address. A processor may include load buffer entries having predictor table entries associated therewith, including saturation counters to record history of previous conflicts between loads and stores corresponding to the same target address. A watchdog unit may disable memory disambiguation (MD) if the MD causes too high a misprediction rate for load operation and store operation conflicts. In one embodiment, the MD is disabled if a flush counter value reaches a threshold.

17 Claims, 8 Drawing Sheets

(56) References Cited

U.S. PATENT DOCUMENTS

| | | | |
|---|---|---|---|
| 5,903,768 | A | 5/1999 | Sato |
| 5,987,595 | A | 11/1999 | Yoaz et al. |
| 6,058,472 | A | 5/2000 | Panwar et al. |
| 6,108,770 | A | 8/2000 | Chrysos et al. |
| 6,694,424 | B1 | 2/2004 | Keller et al. |
| 7,181,598 | B2 | 2/2007 | Jourdan et al. |
| 2006/0095734 | A1 | 5/2006 | Filippo et al. |

FOREIGN PATENT DOCUMENTS

| | | |
|---|---|---|
| JP | 62084340 | 4/1987 |
| JP | 1187634 | 7/1989 |
| JP | 7006033 | 1/1995 |
| JP | 7219771 | 8/1995 |
| JP | 9134287 | 5/1997 |

OTHER PUBLICATIONS

"Intel's Responses to Plaintiff's 1st Set of Interrogatories (Nos. 1-13)", Intel Corporation, Apr. 10, 2008, 6 pages.

Moshovs et al. "A Dynamic Approach to improve the accuracy of data speculation", Computer Science department University of Wisconsin Madison, Mar. 13, 1996, pp. 1-14.

Eickemeyer et al., "A Load Instruction Unit for Pipelined Processors", IBM J. Res. Develop. vol. 37, Issue No. 4, Jul. 1993, pp. 547-564.

Smith, James E.; "A Study of Branch Prediction Strategies", Proceedings of the 8th annual symposium on Computer Architecture, 1981, pp. 135-148.

Hunt D.; "Advanced Performance Features of the 64-bit PA-8000", Digest of Papers Compcon '95 Technologies for the Information Superhighwayapos, Mar. 5-9, 1995, 19 pages.

Jacobsen et al., "Assigning Confidence to Conditional Branch Predictions", Proceedings of the 29th annual ACM/IEEE international symposium on Microarchitecture, 1996, pp. 142-152.

McFarling; "Combining Branch Predictors", Digital Western Research Lab Technical Note TN-36, Jun. 1993, 30 pages.

Smith, J. E.; "Dynamic Instruction Scheduling and the Astronautics ZS_1", Computer, vol. 22, Issue 7, Jul. 1989, pp. 21-35.

Gallagher et al., "Dynamic Memory Disambiguation Using the Memory Conflict Buffer", Centre for Reliable and High-Performance Computing University of Illinois, 1994, pp. 183-193.

Simone et al., "Implementation trade-offs in using a restricted data flow architecture in a high performance RISC microprocessor", 22nd Annual International Symposium on Computer Architecture, Jun. 1995, pp. 151-162.

Chang et al., "Improving Branch Prediction Accuracy by Reducing Pattern History Table Interference", Proceedings of the 1996 Conference on Parallel Architectures and Compilation Techniques, 1996, pp. 48-57.

Wilson et al., "Increasing Cache Port Efficiently for Dynamic Superscalar Microprocessors", ACM SIGARCH Computer Architecture News, vol. 24, Issue 2, May 1996, pp. 147-157.

Sohi, Gurinders S.; "Instruction Issue Logic for High-Performance, Interruptible, Multiple Functional Unit, Pipelined Computers", IEEE Transactions on Computers, vol. 39, Issue 3, Mar. 1990, pp. 349-359.

Lightner et al., "The Metaflow Lightning Chipset", Compcon Spring '91 Digest of Papers, Feb. 25-Mar. 1, 1991, pp. 13-18.

Dwyer III, Harry, "Multiple Out-of-Order, Instruction Issuing System for Superscalar Processors," UMI Dissertation Information Service, Cornell University, Aug. 1991, 267 pages.

Sohi et al., "Multiscalara Processors", Proc. 22nd Int. symposium on Computer Architecture, 1995, pp. 414-425.

Su et al., "On Data Synchronizations for Multiprocessors", Proc. 16th Annual Symposium on Computer Architecture, May 1989, pp. 416-423.

"R10000 Microprocessor, product overview, MIPS Technologies incorporated", MIPS open RISC Technology, Oct. 1994, pp. 1-12.

Sohi et al., "ARB A Hardware Mechanism for Dynamic Recording of Memory References", IEEE Translations on Computers, vol. 45, Issue 5, 1996, pp. 552-571.

Austin et al., "Dynamic Dependency Analysis of Ordinary Programs", In Proceedings of the 19th Annual International Symposium on Computer Architecture, 1992, pp. 342-351.

Smith et al., "The Microarchitecture of Superscalar Processors", Proceedings of the IEEE, vol. 83, Issue 12, Dec. 1995, pp. 1609-1624.

Breach et al., "The Anatomy of the Register File in a Multiscalar Processor", Proc. MICRO-27, 1994, pp. 181-190.

Hao et al., "The Effect of Speculatively Updating Branch History on Branch Prediction Accuracy, Revisited" Department of Electrical Engineering and Computer Science, 1994, pp. 228-232.

Popescu et al., "The Metaflow Architecture", IEEE Micro, vol. 11, Issue 3, Jun. 1991, pp. 10-13, 63-73.

Yeager, K.C.; "The MIPS R10000 Superscaler Microprocessor" IEEE Micro, Apr. 1996, pp. 28-40.

Evers et al., "Using Hybrid Branch Predictors to Improve Branch Prediction Accuracy in the Presence of Context Switches", International Symposium on Computer Architecture, vol. 24, Issue 2, May 1996, pp. 3-11.

Case, Brian, "What's Next for Microprocessor Design?", Microprocessor Report, Oct. 2, 1995, pp. 16-18.

Yeh et al., "Alternative Implementations of two-level adaptive branch prediction", Proceedings of the 19th annual international symposium on Computer architecture, May 19-21, 1992, pp. 124-134.

Yeh et al., "Two Level Adaptive Training Branch Prediction" Department of Electrical Engineering and Computer Science, 1991, pp. 51-61.

"Intel's Responses to Plaintiff's 1st Set of Interrogatories (Nos. 1-13)", Inter Corporation, Jan. 13, 2009, 10 pages.

Alexander et al., "Distributed Predictive Cache Design for High Performance Memory System", Computer Science Department, Aug. 17, 1995, pp. 1-11.

Alexander et al., "Distributed Prefetch -buffer/ Cache Design for High Performance Memory Systems", Proceedings, Second International Symposium on High-Performance Computer Architecture, Feb. 3-7, 1996, pp. 254-263.

Diefendorff et al., "Organization of the Motorola 88110 Superscalar RISC, microprocessor", Micro IEEE, vol. 12, Issue 2, Apr. 1992, pp. 40-63.

Ando et al., "Unconstrained Speculative Execution with Predicated State Buffering", 22nd Annual International Symposium on Computer Architecture, Jun. 1995, pp. 126-137.

Asprey et al., "Performance Features of the PA7100 Microprocessor"Micro IEEE, vol. 13, Issue 3, Jun. 1993, pp. 22-35.

MC 88110 Second Generation RISC Microprocessor User's Manual, Motorola, 1991, 626 pages.

Breach, Scott E., "Design and Evaluation of a Multiscalar Processor", University of Wisconsin-Madison, Dec. 1998, 318 pages.

Pnevmatikatos et al., "Control Flow Prediction for Dynamic ILP Processor", Proceedings of the 26th annual international symposium on Microarchitecture, 1993, pp. 153-163.

Vajapeyam et al., "Exploitation of Instruction-Level Parallelism in a cray X-MP Processor", Proceedings of the International Conference on Computer Design( ICCED 90), Boston MA, Sep. 1990, pp. 20-23.

Chen et al., "Effective Hardware-Based Data Prefetching for High Performance Processors", IEEE Transactions on Computers, vol. 44, Issue 5, May 1995, pp. 609-623.

Bear et al., "An Effective On-Chip Preloading Scheme to Reduce Data Access Penalty", Proceedings of the 1991 ACM/IEEE conference on Supercomputing, 1991, pp. 176-186.

"EV6 Specification Rev 1", Digital Equipment Corporation, Feb. 20, 1995, 103 pages.

"EV6 Specification Rev 2", Digital Equipment Corporation, Apr. 10, 1996, 153 pages.

Dwyer et al., "An out of order Superscalar Processor with Speculative Execution and Fast, Precise Interrupts", In Proceedings of the 25th Annual International Symposium on Microarchitecture, 1992, pp. 272-281.

(56) References Cited

OTHER PUBLICATIONS

Govindan et al., "Speculative Computation: Overcoming Communication Delays in Parallel Processing", International Conference on Parallel Processing, vol. 3, Aug. 15-19, 1994, pp. 12-16.

Sohi et al., "High Bandwidth Data Memory System for Superscalar Processors", Proceedings of the 4th International Conference on Architectural support for Programming Languages and operating Systems, Apr. 1991, pp. 53-62.

Austin et al., "Streamlining Data Cache Access with Fast Address Calculation", ACM SIGARCH Computer Architecture News, vol. 23, Issue 2, May 1995, pp. 369-380.

Friedman, Mark A., "A Characterization of Prolog Execution", Doctor of Philosophy, 1992, 144 pages.

Gabbay, Freddy; "Speculative Execution based on value Prediction", Technion—Israel Institue of Technology EE Department TR #1080, Nov. 1996, pp. 1-65.

Dick Pountain, "Numerous Function Units and Smart load/ store processing make the PA-8000the fastest RISC processor", CPUs Core Technologies, Jul. 1995, pp. 175-176.

Tyson et al., "A New Approach to Cache Management", Technical Report No. CSE-95-6, Computer Science Department, Aug. 8, 1995, pp. 1-23.

Huang et al., "Speculative Disambiguation: A Compilation Technique for Dynamic Memory Disambiguation", Proceedings of the 21st annual international symposium on Computer architecture, 1994, pp. 200-210.

Sazeides et al., "The Performance Potential of Data Dependence Speculation & Collapsing", In Proceedings of International Symposium on Microachitecture, 1996, pp. 238-247.

Iannucci, Robert A.; "Toward a Dataflow/ von Neumann Hybrid Architecture", Conference Proceedings, 15th Annual International Symposium on Computer Architecture, May 30-Jun. 2, 1988, pp. 131-140.

Franklin et al., "The Expandable Split Window Paradigm for Exploiting Fine-Grain Parallelism", Computer Science Department, 1992, pp. 58-67.

Pierce et al., "The effect of speculative execution on cache performance", Eighth International Parallel Processing Symposium, Apr. 26-29, 1994, pp. 172-179.

Austin et al., "Zero-Cycle Loads: Microarchitecture Support for Reducing Load Latency", IEEE Proceedings of Micro-28, 1995, pp. 82-92.

Pan et al., "Improving the Accuracy of Dynamic Branch Prediction Using Branch Correlation", Proceedings of the 5th international conference on Architectural support for programming languages and operating systems, 1992, pp. 76-84.

Tjaden et al., "Detection and Parallel Execution of Independent Instructions", IEEE Transactions on Computers, vol. 19, Issue 10, Oct. 1970, pp. 889-895.

Lipasti et al., "Value Locality and Load Value Prediction", Department of Electrical and Computer Engineering, 1996, pp. 138-147.

Lipasti et al., "Exceeding the Dataflow Limit via Value Prediction", Department of Electrical and Computer Engineering, 1996, pp. 226-237.

Vijaykumar, T.N. "Compiling for the MultiScalar Architecture", Doctor of Philosophy, 1998, 205 pages.

McLellan, "The Alpha AXP Architecture and 21064 Processor", IEEE Micro, vol. 13, Issue 3, Jun. 1993, pp. 36-47.

Moshovs, Andreas Ionnis; "Memory Dependence Prediction", Doctor of Philosophy (Computer Science) University of Wisconsin_Madison, 1998, pp. 176.

Patt et al., "Branch Classification—a new mechanism for improving branch predictor performance" Proceedings of the 27th Internatioal Symposium on Microarchitecture, Nov. 30-Dec. 2, 1994, pp. 22-31.

Pickett et al., "Enhanced Superscalar Hardware : The schedule table", Proceedings of Supercomputing '93, Nov. 15-19, 1993, pp. 636-644.

Chrysos et al., "Memory Dependence Prediction Using Store Sets," IEEE, 1996, pp. 142-153.

Reinman et al., "Predictive Techniques for Aggressive Load Speculation," 1998, pp. 1-11.

Adi Yoaz; Mattan Erez; Ronny Ronen; and Steven Jourdan, "Speculation Techniques for Improving Load Related Instruction Scheduling," 26th Annual International Symposium on Computer Architecture (ISCA-26), Atlanta, Georgia, USA, May, 1999, pp. 42-53 (12 pages).

Franklin, Manoj; "The Multiscalar Architecture," A thesis submitted in partial fulfillment of the requirements for the degree of Doctor of Philosophy (Computer Sciences), University of Wisconsin, Madison, Wisconsin, 1993, 210 pages.

Nicolau, Alexandru; "Run-time Disambiguation: Coping with Statistically Unpredictable Dependencies," IEEE Transactions on Computers, vol. 38, Issue 5, May 1989, pp. 663-678.

MEMORY DISAMBIGUATION TECHNIQUES USING COUNTER RATIO TO SELECTIVELY DISABLE LOAD/STORE CONFLICT PREDICTION

This is a continuation of application Ser. No. 11/370,723, filed Mar. 7, 2006, now U.S. Pat. No. 7,590,825.

BACKGROUND

1. Field

The present disclosure pertains to the field of information processing, and, more specifically, to the field of memory access management.

2. Background

In some prior art microprocessors or processing systems, information (data or instructions) may be accessed by a microprocessor using operations such as "load" operations or "store" operations. Furthermore, load and store operations may be performed in response to an instruction (or sub-instruction, such as a micro-operation, or "uop") being executed by a processor. In some processing architectures, load instructions may be decoded into one uop, whereas store instructions may be decoded into two or more uops, including a store address (STA) uop and a store data (STD) uop. For the purpose of this disclosure both store uops and instructions will be referred to as "store operations" or "stores" and load uops and instructions will be referred to as "load operations" or "loads".

In some processors or processing systems, a number of load and store operations may be executed, or otherwise pending, concurrently. For example, in a pipelined processor containing multiple processing stages that may each operate on different operations concurrently, there may be several load and store operations being performed concurrently, each at a different stage within the pipeline. However, at various pipeline stages, the address from where data is to be loaded by load instructions or to where data is to be stored by store instructions (collectively referred to as "target address") is unknown, or "ambiguous". This is because the target address of load and store instructions or uops are sometimes determined after the load or store has already begun to be executed.

FIG. 1 illustrates a portion of a pipelined processor having a fetch/prefetch stage, one or more rename units to assign registers to appropriate instructions or uops, and one or more scheduling units/reservation station units to schedule and store instructions or uops, such as uops corresponding to loads and stores, until their respective target addresses are determined.

When load and stores (e.g., STA uops) are dispatched from the reservation station, they may be sent to the address generation unit, which generates a corresponding linear address for the load and stores to be sent to memory or cache. Load operations are typically dispatched from the reservation station into a load buffer within memory ordering buffer (MOB), where the loads are checked for conflicts and dependencies with other store operations. If no conflicts or dependencies with stores exist, the load may be dispatched to the memory/cache cluster. Otherwise, the load may have to wait in the MOB until the dependencies and/or conflicts are resolved before being dispatched to memory/cache.

Once the loads are dispatched to memory/cache, the memory/cache may return data targeted by the load to the execution unit reservation station, which may use the loaded data to generate an address to the next operand of some successive uop to be dispatched from the scheduler/reservation station.

Store operations, which may include STA uops, may follow a similar path as loads. However, stores are not typically allowed to be dispatched to the memory/cache out of program order, whereas loads may be dispatched to memory/cache anytime no dependencies/conflicts exist between the loads and other store operations.

In some prior art processors, the MOB is used to store load and store operations in proper order, such that all store operations to write information to a memory location are dispatched and allowed to write their information to memory before load operations that may use information from the same address. Store operations appearing in program order before corresponding load operations (i.e. load operations having the same target address as the earlier store operations) may be referred to as "older" store operations and the corresponding load operations may be referred to as "newer" load operations than the earlier store operations in program order.

Loads may access memory out of program order in relation to stores if no dependencies/conflicts between the loads and stores exists. In some of the prior art, loads being processed before older pending stores were assumed to always correspond to the same target memory address in order to prevent the chance that an earlier processed load could load data that was to be updated by the older store, and therefore produce an incorrect result in whatever program they corresponded to by returning obsolete information.

However, this assumption may prove to be too conservative, in as much as not all loads that are processed before older pending stores in program order are processed correspond to the same memory address. As a result, loads may be delayed from being issued to memory for numerous cycles until the corresponding older pending stores are processed and stored in the proper order in the MOB. This can, in turn, cause unnecessary delays in memory access time, which can unduly erode processor and system performance.

BRIEF DESCRIPTION OF THE FIGURES

The present invention is illustrated by way of example and not limitation in the accompanying figures.

DETAILED DESCRIPTION

Embodiments of the invention relate to computer systems. More particularly, at least one embodiment of the invention relates to a technique to allow load operations to be issued to memory before older pending store operations. Furthermore, one embodiment of the invention pertains to a technique to disable or enable issuing load operations to memory before older pending store operations depending upon a frequency at which the load and corresponding older store operations do not conflict with each other. Throughout this disclosure, the term "pending" in regard to stores refers to the fact that the target addresses (addresses in memory that the load and store operations are to access) are not yet determined. The term "pending" in regard to loads refers to loads whose target addresses are determined but have yet to be issued to memory/cache.

Instead of always waiting for loads to be processed in program order with respect to pending store operations in the MOB, embodiments of the invention improve the throughput of load accesses to memory by speculating, with/without predicting, whether pending loads (i.e., loads that have yet to be retired) are to load information from memory address not corresponding to any older pending store operation. In at least one embodiment, entries of a load buffer each correspond to a hash predictor array entry, which may maintain a prediction of whether a pending load within a corresponding load buffer entry is to be allowed to access memory ahead of pending older store operations. In one embodiment, the prediction of whether a pending load operation may access memory ahead of a pending older store operation depends upon the success (whether earlier pending loads have accessed memory without conflicting with a older store operation) of prior pending load operations corresponding to a particular predictor table entry.

In one embodiment a saturation counter may be used to maintain a prediction of whether a pending load will conflict (i.e., attempt to access a memory address corresponding to a older pending store operation) with a older pending store operation. If a load that has been allowed to access memory ahead of older pending store operations does ultimately conflict with a older store operation, at least one embodiment restart from the speculative load that caused the conflict. However, at least in one embodiment, a misprediction may occur infrequent enough so as to facilitate an overall improvement in load/store access throughput to memory.

In the event that the success rate of speculative loads accessing memory ahead of older pending store operations fall below a certain threshold, at least one embodiment may include a "watchdog" unit (logic and/or software) to disable pending loads from speculatively accessing memory ahead of older pending store operations. Throughout this disclosure, "memory" may be used to refer to cache, DRAM, or any other memory structure to be accessed by load and store operations.

Figure 1:
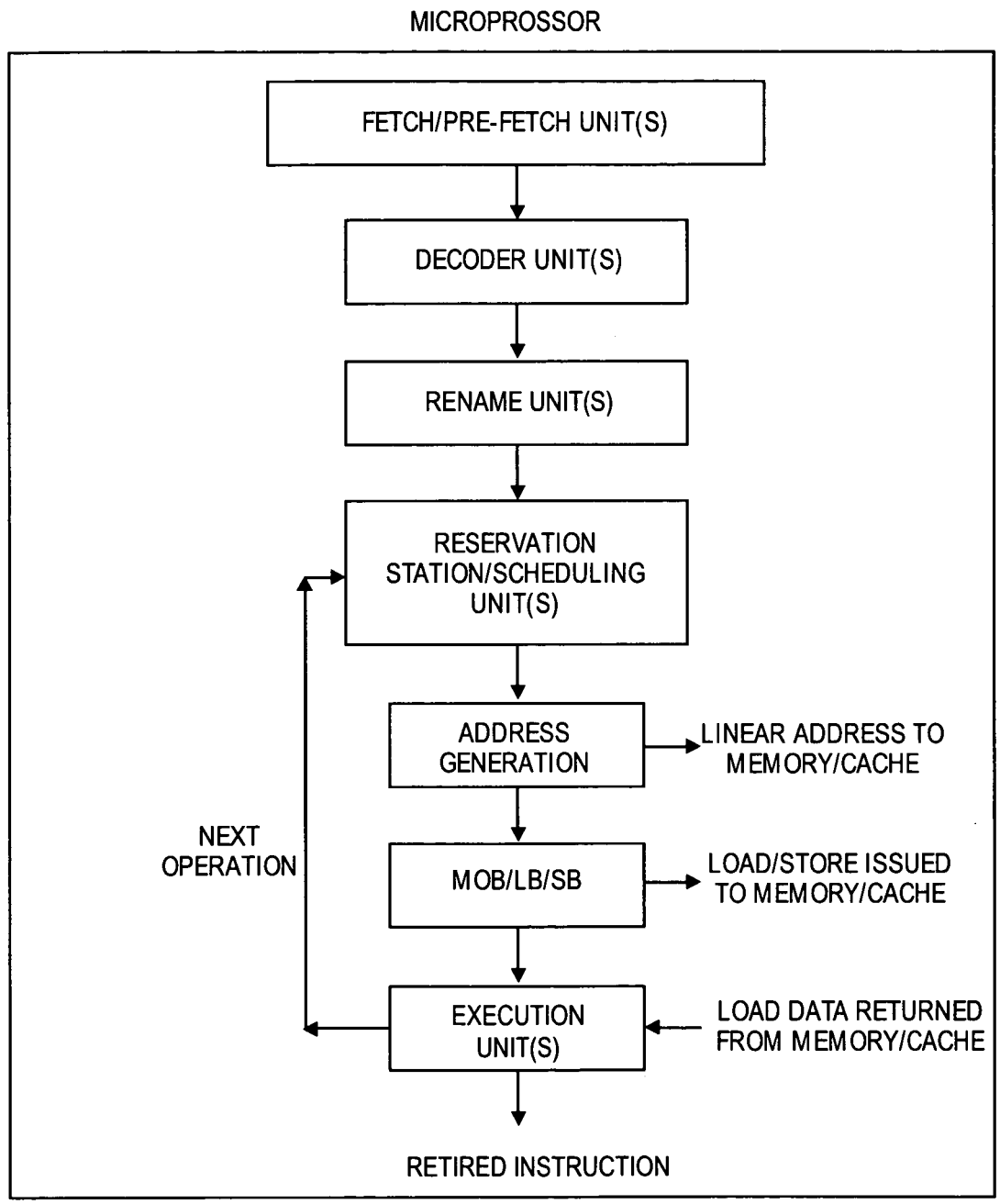
FIG. 1 is a diagram of a prior art processor in which loads and stores are only issued to memory once they are in program order after being executed by the processor.
Figure 2:
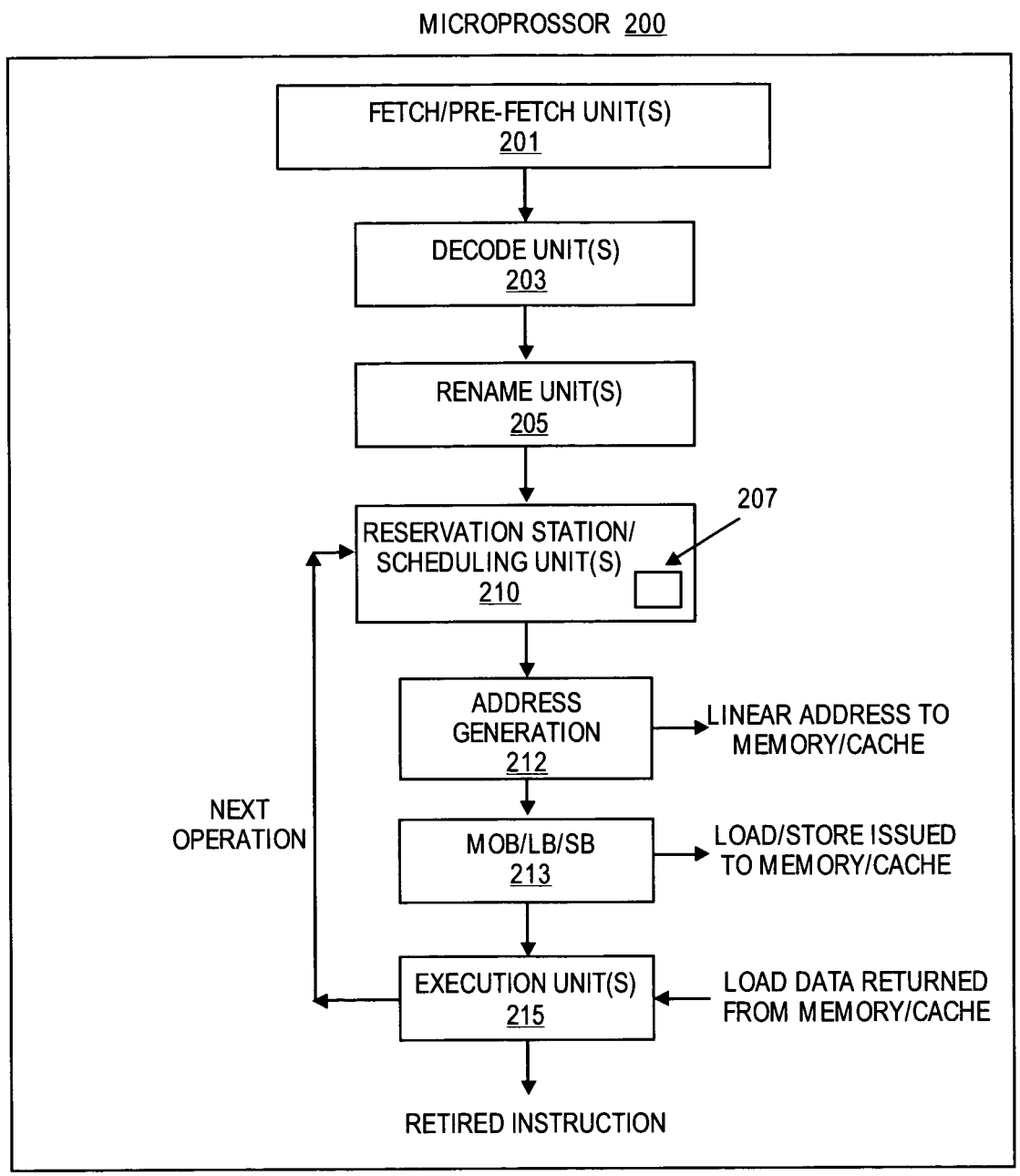
FIG. 2 is a diagram of a processor according to one embodiment of the invention in which loads being processed within the processor are permitted to access memory before corresponding older store operations being processed in the processor.

FIG. 2 illustrates a portion of a processor, according to one embodiment, in which pending loads may be speculatively issued to a memory address before other older pending store operations according to a prediction algorithm, such as a hashing function. In particular, FIG. 2 illustrates a portion of a pipelined processor 200 having a fetch/prefetch stage 201, a decoder stage 203, one or more rename units 205 to assign registers to appropriate instructions or uops, and one or more scheduling/reservation station units 210 to store uops corresponding to load and store operations (e.g., STA uops) until their corresponding target addresses source operands are determined. FIG. 2 also illustrates an address generation unit 212 to generate the target linear addresses corresponding to the load and stores, and an execution unit 215 to generate a pointer to the next operation to be dispatched from the scheduler/reservation stations 210 based on load data returned by dispatching load operations to memory/cache. FIG. 2 also illustrates a MOB 213, which may contain load and store buffers to store loads and stores in program order and to check for dependencies/conflicts between the loads and stores.

In one embodiment, loads may be issued to memory/cache before older stores are issued to memory/cache without waiting to determine whether the loads are dependent upon or otherwise conflict with older pending stores. In this manner, at least one embodiment of the invention can improve processor performance due to the fact that loads can be issued without waiting for the target addresses of older stores to be determined, the data from which can be used by the execution unit to dispatch subsequent operations from the scheduler/reservation station sooner than in some prior art architectures.

In one embodiment, a hash table 207 may be used with multiple entries corresponding to loads stored in the load buffer, for example, or loads pending anywhere in the processor. In one embodiment, the hash table is stored in memory, realized in logic circuits, and/or implemented in software. In one embodiment, each entry of the hash prediction table may contain at least one saturation counter to maintain a prediction of whether each load may be issued to memory ahead of older pending store operations pending in the processor. Advantageously, the hash prediction entries may be indexed by an instruction pointer (EIP) or some derivative thereof (e.g., hashed version of EIP).

Figure 3:
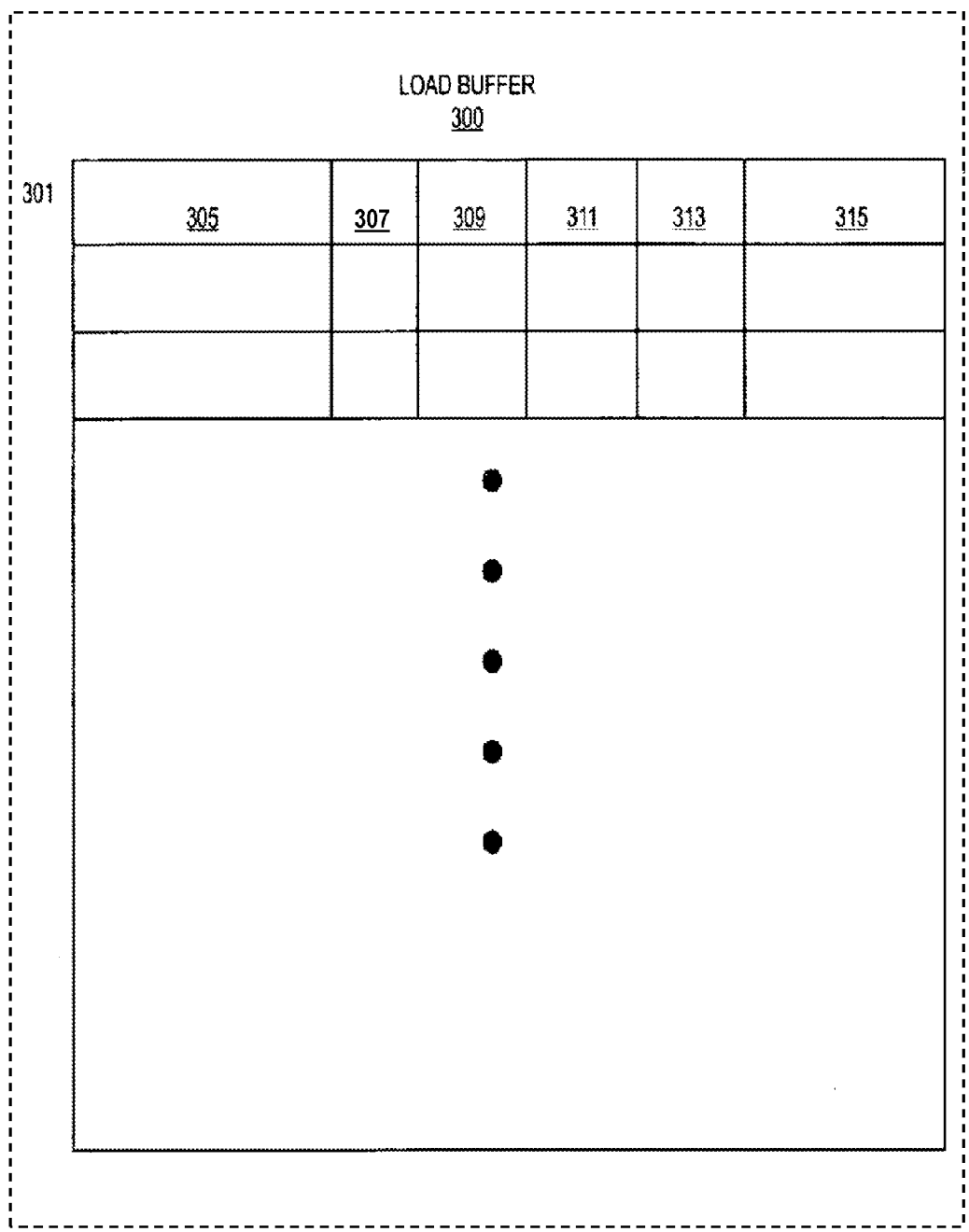
FIG. 3 illustrates a load buffer, according one embodiment of the invention, that may store load operations to be issued to memory before corresponding older store operations.

FIG. 3 illustrates a load buffer 300 according to one embodiment of invention, wherein each entry may contain a load operation that may be allowed to access memory ahead of older pending store operations and before the loads are retired and stored in the MOB. In addition to the opcodes, data, and other information corresponding to the load operation 305, the load buffer entries, including load buffer entry 301 for example, may contain other fields to keep track of whether the load operation corresponding to the load buffer entry may access memory before older pending store operations.

For example, in one embodiment, each entry may contain a field (MDA field 307) to store bits indicating whether the load is allowed to access memory before pending older store operations, a field (MDD field 309) to indicate whether the corresponding load operation has in fact accessed memory before older pending store operations, a field (MDU field 311) to indicate whether the corresponding load operation should cause the corresponding predictor entry to be updated (based on existence of an older store operation with unresolved address, for example), a field (MDR field 313) to indicate whether the corresponding load should cause the predictor to be reset (in the case of conflict between a load and a store, for example), and a field 315 to store a store color value that indicates the store buffer entry of the youngest store in the store buffer(s) that is older than the load within the particular load buffer entry. Similarly, store buffers within the processor of FIG. 2 may contain a field in each entry to indicate the load color, which is the oldest load operation in the load buffer younger than the store operation to which the load color field pertains. Other fields may also be present within each load buffer entry, including a saturation counter field for performing a hash prediction on whether to allow the corresponding load operation to access memory before other pending older store operations. The relative positions and sizes of the fields illustrated in FIG. 3 are not representative of all embodiments. In other embodiments the fields may be in different locations and may be of different sizes.

Figure 4:
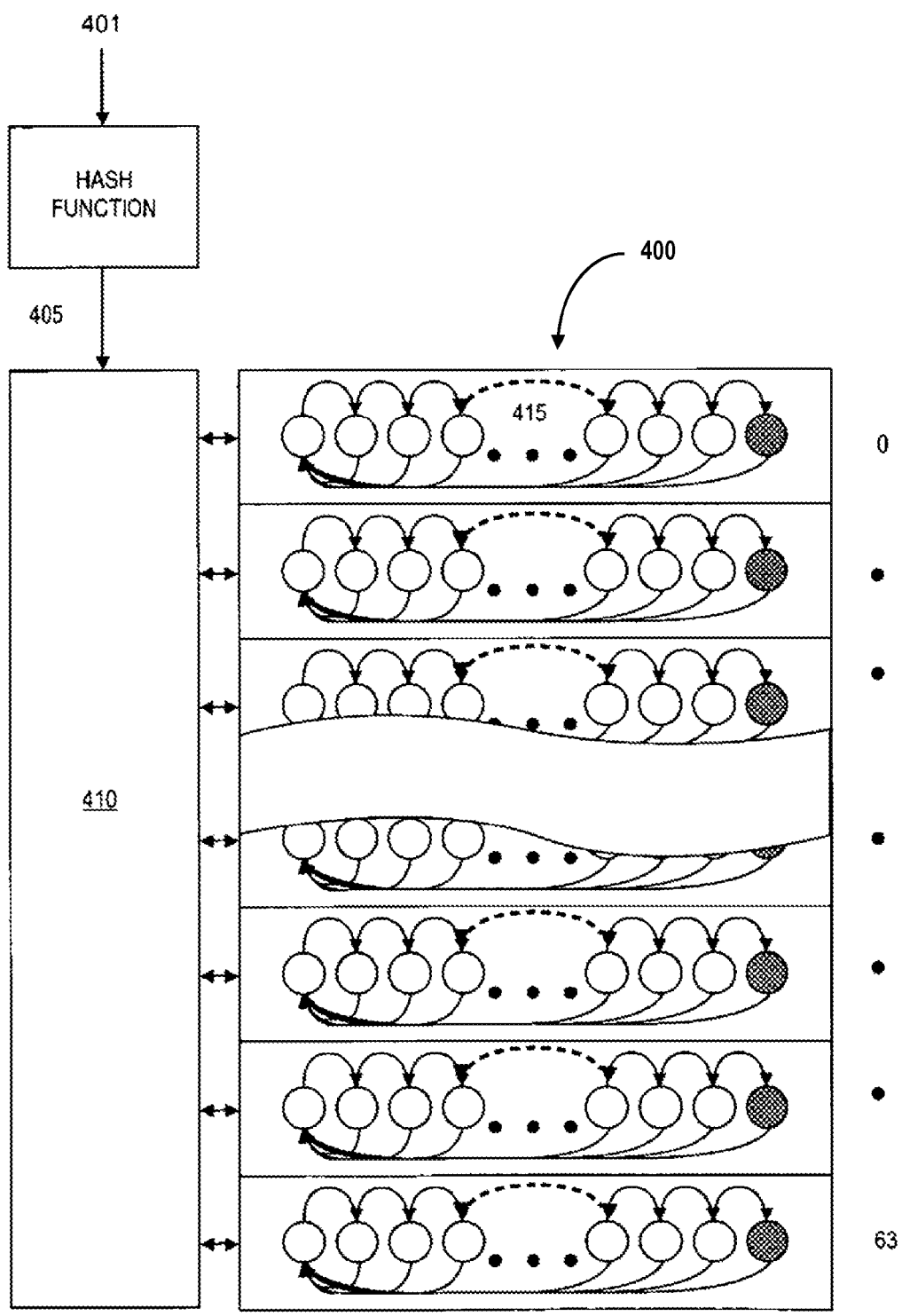
FIG. 4 illustrates a prediction unit to predict whether load operations stored in load buffer entries may be issued to memory before corresponding older stores according to one embodiment.

Loads stored in the load buffer or other structure may be associated with a predictor table entry, which may implement a hashing function using saturation counters (e.g., 415) in one embodiment to record a history of successful predictions of non-conflicting load and stores. Other prediction techniques may be used in other embodiments. FIG. 4 illustrates a predictor table 400, according to one embodiment, whose entries correspond to entries of at least one load buffer, such as the one illustrated in FIG. 3. In one embodiment, the prediction table may be an integral part of one or more load buffers. In other embodiments, the prediction table may be in a separate circuit from one or more load buffers.

The prediction table of FIG. 4 is indexed with a hashed version 401 of the EIP 405 corresponding to a load operation. In one embodiment, six least significant bits of a load's EIP is used to index a prediction table of 64 entries (labeled 0 through 63) via indexing logic 410. In one embodiment, each predictor entry behaves as a saturation counter of 16 states, including a reset state, implemented in 4 bits. In other embodiments, more or fewer bits of the EIP, or some function of the EIP, may be used to index more or fewer predictor table entries. Likewise, in other embodiments each entry may behave as a saturation counter with more or fewer states using more or fewer bits. Furthermore, other history tracking techniques may be used in other embodiments.

In one embodiment, a saturation counter (e.g., 415) corresponding to a load to be issued to memory prior to pending older store operations is incremented or reset to a zero value (or other beginning value) during the load's retirement. In other embodiments, the saturation counter may be modified at other instances. In one embodiment, a saturation counter corresponding to a load that was issued to memory prior to older pending stores is incremented if the load retired without "colliding" (i.e., loading data from a memory address to which the pending older store operation is to write information) with an older store operation that was pending at the time the load was issued. In one embodiment, a saturation counter corresponding to a load to be issued to memory prior to older pending stores is reset if the load collided with an older store operation that was pending when the load was issued (determined, for example, when the load retires).

In one embodiment, a load is issued from one or more processor reservation stations (rather than from the MOB) before pending older store operations if a saturation counter in the predictor table corresponding to that load has reached a threshold value. Otherwise, the load may not be issued from a reservation station, but instead must be issued from the MOB in program order with respect to the older pending stores. In one embodiment, the threshold value of at least one of the saturation counters corresponds to 15 consecutive non-conflicting load issuances, reflected in 15 of the 16 states of the counter, including reset, in one embodiment. In other embodiments, a less-conservative threshold may be chosen, such as 10 consecutive non-conflicting load issuances.

In one embodiment, loads may be scheduled out of order within the scheduler and later sent to the MOB. Loads may then be forwarded from the MOB to be executed immediately ("MOB bypass") if, for example, there are not previous stores pending, or there are previous stores pending, but the predictor has reached the threshold value. The MOB may alternatively decide that the load cannot continue yet to the execution units (for example, if there are older stores not yet resolved and the correspondent predictor counter is not saturated.) in the cases, the MOB will re-schedule the load later, when the problematic stores are resolved).

In one embodiment, after a saturation counter corresponding to a load of information from a memory address reflects 15 consecutive non-conflicting issuances of loads from that memory address, then subsequent loads may be issued to the memory address out of program order (that is, from the reservation station, via MOB bypass, ahead of older stores), rather than waiting to be issued from the MOB in program order respect to older pending stores. However, in one embodiment, if a load is determined at retirement to have been issued to a memory location in which an older store was to store information (i.e. a conflict between the load and an older store occurs), the saturation counter in the prediction table corresponding to that load (i.e., corresponding the load's EIP) is reset to an initial state, such as a zero value, or decremented to a lesser value, and no further loads from that address may be predicted to be non-conflicted (and therefore be issued to memory before older pending stores to that address) until the saturation counter reaches the threshold value again (e.g., after 15 consecutive non-conflicted loads, in one embodiment). If a load is mispredicted, issued to memory, and is in fact determined to be conflicted with an older store, then the load must be reissued (after performing a pipeline flush/restart operation, for example) from the MOB in program order (i.e. after the older store operations' target addresses have been determined and the stores are stored in program order in the MOB with the loads).

In one embodiment, a saturation counter in the prediction table corresponding to a load to be issued to memory is indexed by the hashed EIP. The result of reading the counter value can be stored in the MDA bit (e.g., "1" for a positive prediction, or "allowed", "0" for a negative prediction, or "not allowed") associated with the load, which may be located in a load buffer or the reservation station or some other structure. If the counter value is saturated (i.e., at or above the threshold value), then the load is presumed to not conflict with any older stores that have yet to be issued to memory and the load may be issued to access memory at the targeted address. If the load is later found to conflict with an older store (e.g., after older store target addresses have been determined), then the load is flushed/invalidated and re-issued to memory from the MOB (i.e., in program order with the older stores).

If the predictor is read for a given load and the corresponding counter is not saturated (i.e., contains a value below the threshold), then the load will be stored in the MOB and issued to memory in program order in relation to pending older stores. In one embodiment, MDU bit will be set if the load conflicts with an older store. If the load actually loads information from memory before older pending stores (i.e. load was predicted to not conflict), regardless of whether the load actually conflicts with older stores, then the MDD bit is set. This bit can be consulted to determine whether it is necessary to verify that the prediction was correct. Again, if the prediction was not correct and there was in fact a conflict with an older store, the load will be flushed/invalidated and re-issued along with all following instructions.

In order to detect a misprediction, according to one embodiment, the target addresses of stores older than the load that were resolved after executing the load, are compared with the target address younger loads, including those of the mispredicted load. Once a matching target address of the load and an older store is found, the MDR bit can be set to reflect that the counter for that load must be reset. Furthermore, in one embodiment, an MDD bit can be set to indicate that the mispredicted load is to be flushed/invalidated.

In one embodiment, logic associated with the MOB uses the MDU and MDR bits (stored in a load buffer entry corresponding to the load issued to memory before pending older stores) to determine how the predictor table entry for the predicted/mispredicted load is to be updated. For example, in one embodiment, if the MDU bit is not set, the corresponding saturation counter is not updated, whereas if the MDU bit is set and the MDR bit is not set, the counter is incremented. However, if the MDU and the MDR bits are both set, the counter is reset. The following table summarizes the use of the MDU and MDR bits in determining how or whether to update the predictor table entry for a given load, according to one embodiment:

| MDU | MDR | Action to be Taken |
| --- | --- | --- |
| 0 | Don't care | Counter is not updated |
| 1 | 0 | Counter is incremented |
| 1 | 1 | Counter is reset |

In one embodiment, the prediction of whether a load to be issued to memory before pending older stores can be temporarily disabled in order to preserve processor performance if the number or rate of mispredictions becomes too high. The prediction technique can then be re-enabled after a certain amount of time or after certain criteria are met. In one embodiment, logic, software, or some combination thereof may be used to implement a "watchdog" unit to control whether the prediction of loads issued to memory before older pending stores is to be enabled or disabled. In one embodiment, the watchdog can be conceptualized as implementing two different states (via a logic state machine, for example), each using two counters to track the success of predictions of any or all loads issued to memory prior to older pending stores.

For example, in one embodiment, when the prediction mechanism described above is enabled, two counters—a disambiguation counter and a flush counter—are used to track the success rate of load predictions. Specifically, a disambiguation counter may increment each time a load is successfully predicted to not conflict with an older pending store operation and therefore loads targeted information from memory without being issued to memory in program order (e.g., from a MOB). On the other hand, a flush counter may decrement each time a load is mispredicted to not conflict with an older pending store operation, which may be determined after the load retires in one embodiment. In addition, the flush counter may be incremented by carry-out values from the disambiguation counter. After the flush counter decrements below zero, thereby creating a negative ratio between the disambiguation counter value and the flushes counter value, then the prediction mechanism is disabled and loads are issued to memory from a MOB in program order with older stores.

The determination of whether to enable the prediction mechanism can also rely on the use of a counter, such as a prediction counter to count the number of successful would-be predictions, and another counter, such as a misprediction counter to count the number of would-be mispredictions. In one embodiment, the prediction counter is incremented after a load is retired that would have otherwise been successfully predicted to not conflict with older pending stores if the prediction mechanism was enabled. The prediction counter is reset to some initial value (e.g., "0") after a load is retired that would have otherwise been mispredicted to not conflict with older pending stores if the prediction mechanism was enabled, and the mispredictor counter is incremented. After the prediction counter reaches a saturated value (e.g., the maximum count of the counter) and the misprediction counter is not above a maximum threshold, the prediction mechanism for loads can be enabled. The saturated value can depend on when the implementer believes that there will be enough successfull load predictions to warrant re-enabling the prediction mechanism. In one embodiment, this may be reflected in a ratio of 256 (corresponding to the predictions counter of 8 bits, for example) would-be successful predictions for every 1 (corresponding to a mispredictions counter of one or more bits, for example) would-be mispredictions.

Similarly, the prediction mechanism may be disabled after a desired ratio of successful to unsuccessful predictions is met. For example, in one embodiment the prediction mechanism is disabled if 4 (corresponding to a 2 bit flush counter, for example) or more mispredictions occurs for every 1024 (corresponding to a 16 bit disambiguation counter, for example) successful predictions. In other embodiments, other techniques may be used to track the success rate of predictions, such as time-dependent counters, in order to determine when to enable or disable the prediction mechanism.

Figure 5:
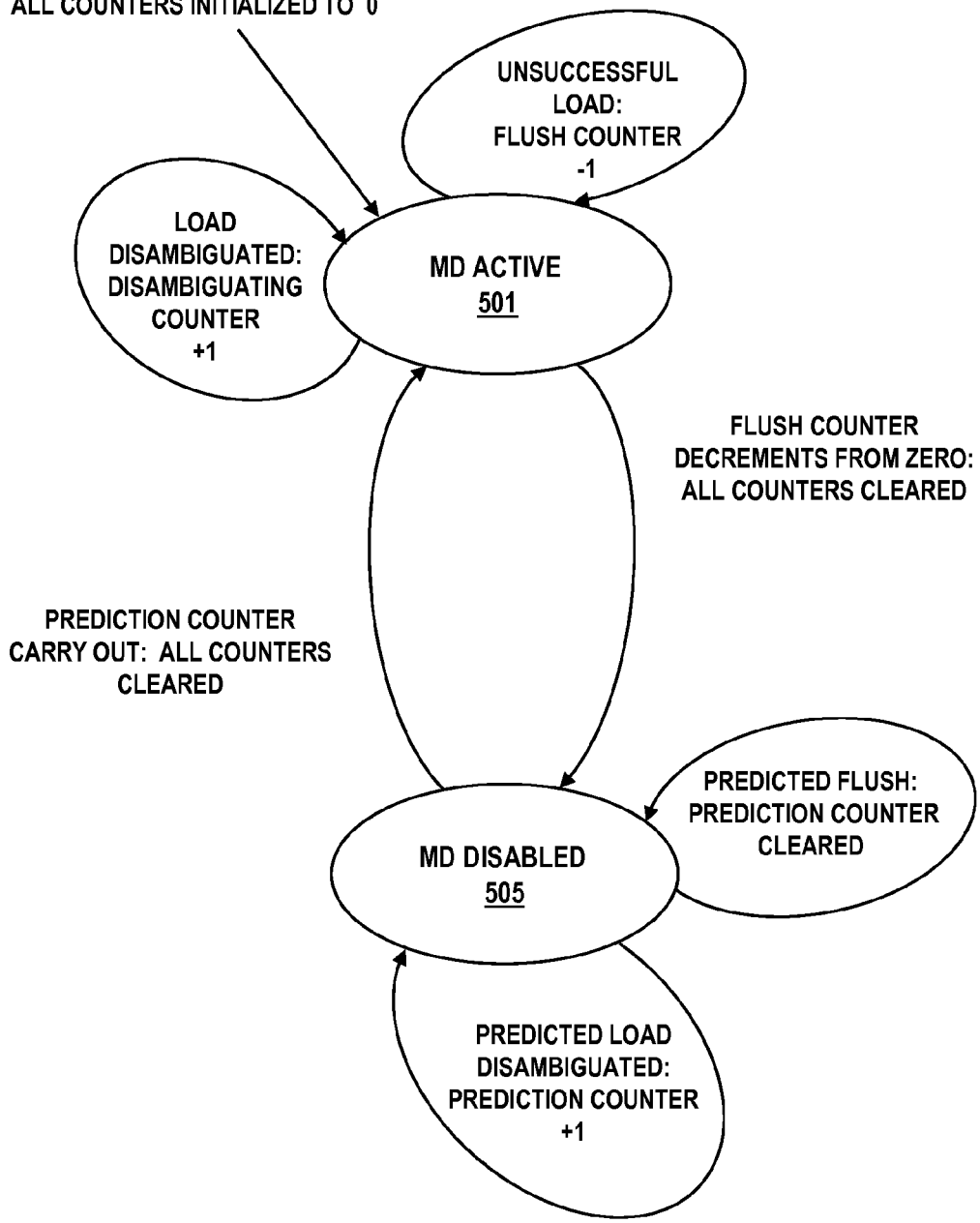
FIG. 5 is a state diagram illustrating the function of a watchdog unit according to one embodiment.

A watchdog unit, such as the one described above can prevent pathological mispredictions of non-conflicting loads from substantially impacting processor performance. FIG. 5 illustrates a state diagram that illustrates the function of a watchdog unit, according to one embodiment. In the active state 501, a disambiguation counter will increment after each successful prediction and flush counter will increment according to the disambiguation's carry-out over its maximum allowed value, whereas the flush counter decrements each time a load is mispredicted. If the flush counter decrements below zero, in one embodiment, the counters are all cleared and the state diagram transitions to the disabled state 505. In the disabled state, if a prediction would have been successful (i.e. if in the enabled state) then a prediction counter in one embodiment is incremented, whereas if a misprediction would have occurred (i.e. if in the enabled state), then the prediction counter is cleared to its initial state. In one embodiment, after the prediction counter reaches its maximum value or some other threshold value or if a carry-out from the counter occurs, the prediction mechanism is enabled.

In one embodiment, load buffer entries may also contain storage location to store a memory disambiguation speculation (MDS) bit to indicate whether the corresponding load would have been dispatched to memory ahead of older store operations, but for the watchdog unit being in the disabled state. An MDS bit, or a bit of similar functionality, may assist in determining the "hit rate" of various load operations.

Figure 6:
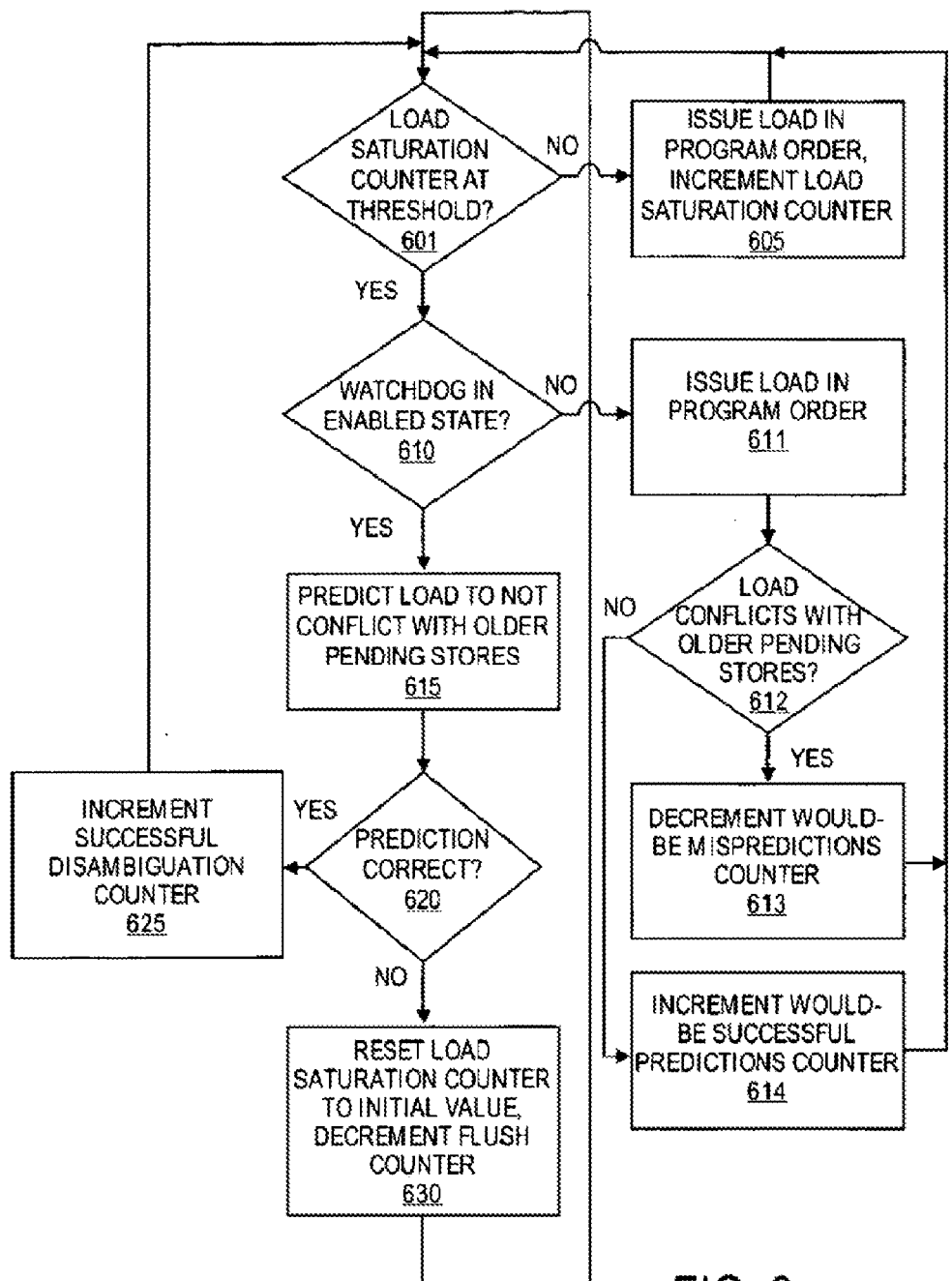
FIG. 6 is a flow diagram that illustrates whether load operations may be issued to memory ahead of corresponding store operations according to one embodiment.

FIG. 6 is a flow diagram illustrating operations that may be performed when performing various aspects of the invention, according to one embodiment. At operation 601, if the saturation counter for a particular load in a load buffer is at the threshold, then at operation 610 if the watchdog is in the enabled state, the load is predicted to not conflict with any older pending stores and therefore can be issued out of order to memory at operation 615. If the saturation counter for the load was not at threshold, then the saturation counter is incremented at operation 605. If the watchdog is not in the enabled state then the load is issued in program order at operation 611. The load is then checked for conflict with older pending stores at operation 612. If the load is conflicting the would-be mispredictions counter is decreased at operation 613. If there is no conflict the would-be successful predictions counter is increased at operation 614. If the load is predicted to not conflict with any older stores and the prediction turns out to be correct when the load is retired at operation 620, then the successful disambiguation counter is incremented at operation 625. However, if the load was mispredicted to not conflict with any older pending stores, then the saturation counter is reset and the flush counter is decremented at operation 630.

Figure 7:
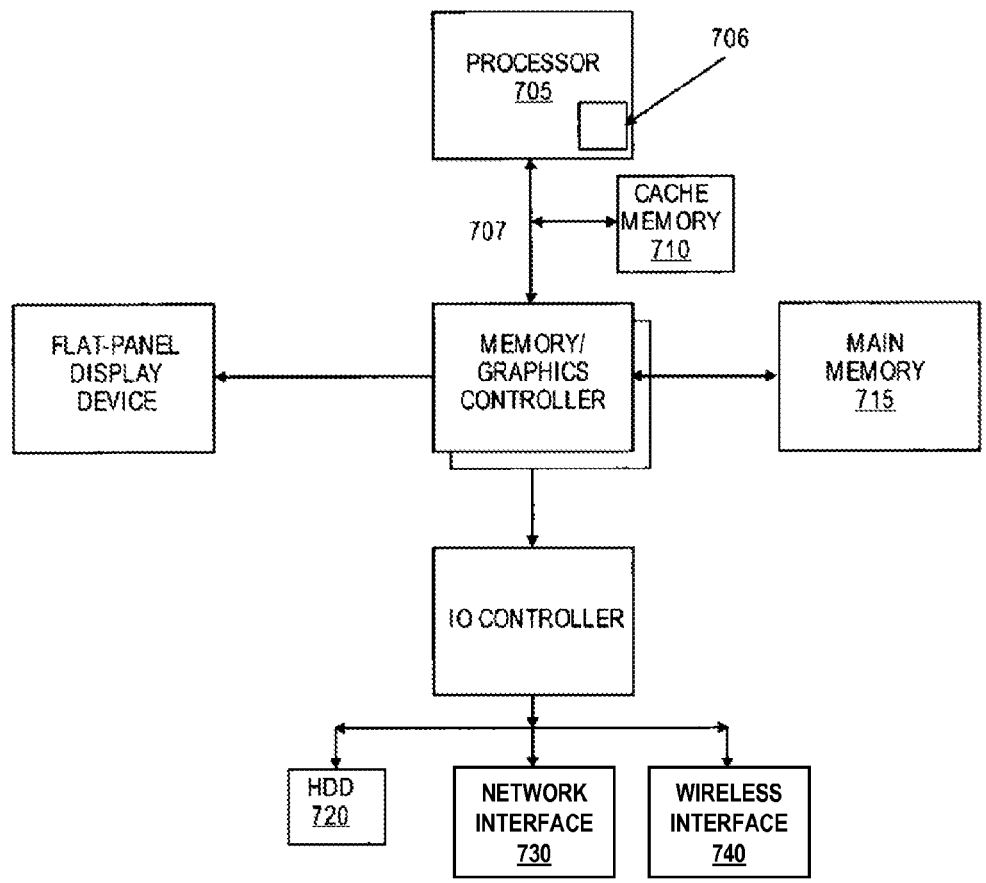
FIG. 7 is a shared bus system in which one embodiment may be used.

FIG. 7 illustrates a front-side-bus (FSB) computer system in which one embodiment of the invention may be used. A processor 705 accesses data from a level one (L1) cache memory 710 and main memory 715. In other embodiments of the invention, the cache memory may be a level two (L2) cache or other memory within a computer system memory hierarchy. Furthermore, in some embodiments, the computer system of FIG. 7 may contain both a L1 cache and an L2 cache.

Illustrated within the processor of FIG. 7 is a storage area 706 for machine state. In one embodiment storage area may be a set of registers, whereas in other embodiments the storage area may be other memory structures. Also illustrated in FIG. 7 is a processor's local bus 707, according to one embodiment. The processor may have any number of processing cores. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 720, or a memory source located remotely from the computer system via network interface 730 or wireless interface 740 containing various storage devices and technologies. The cache memory may be located either within the processor or in close proximity to the processor, such as on the processor's local bus 707.

Figure 8:
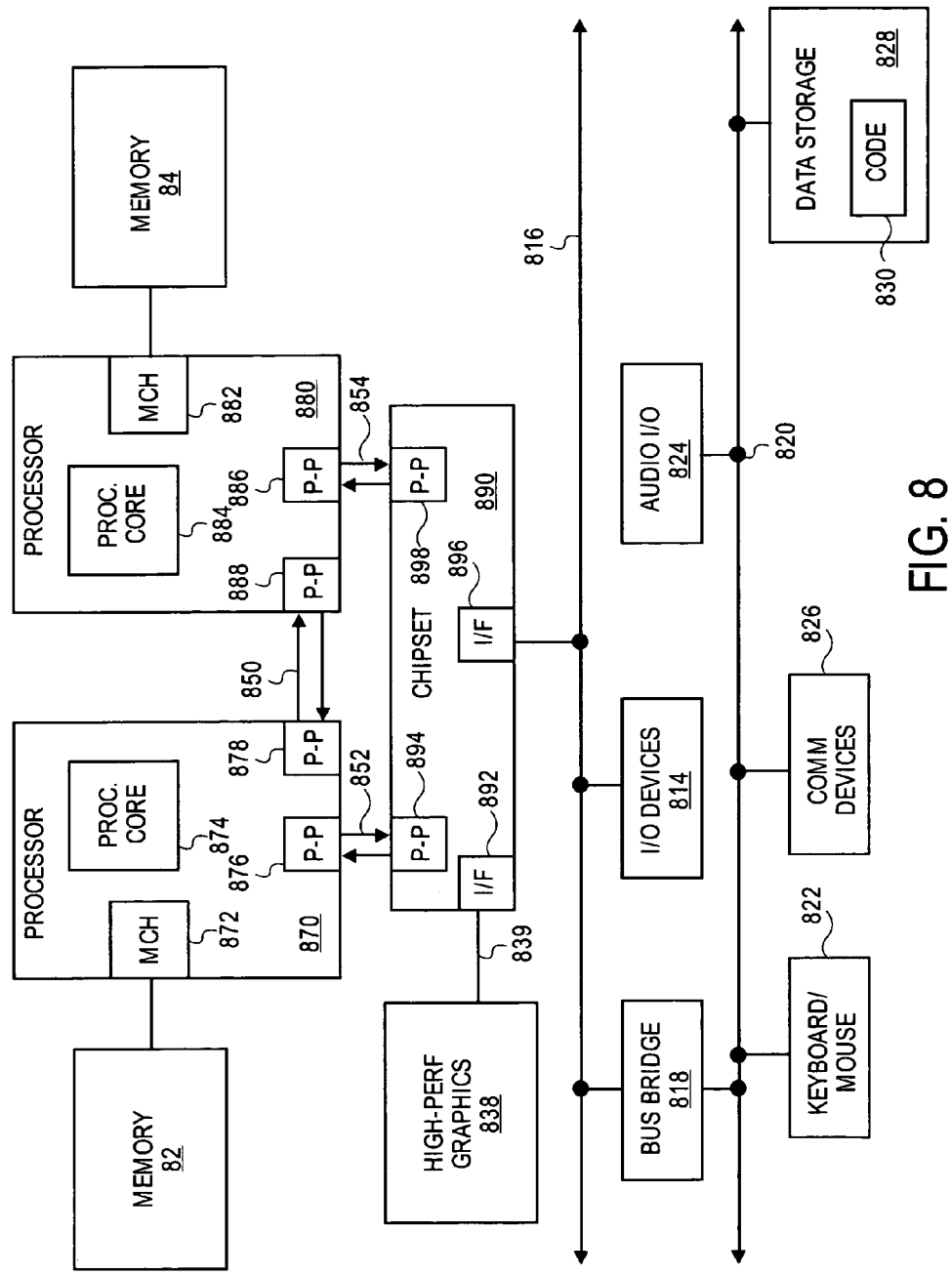
FIG. 8 illustrates a point-to-point bus system in which one embodiment may be used.

Furthermore, the cache memory may contain relatively fast memory cells, such as a six-transistor (6T) cell, or other memory cell of approximately equal or faster access speed. The computer system of FIG. 7 may be a point-to-point (PtP) network of bus agents, such as microprocessors, that communicate via bus signals dedicated to each agent on the PtP network. FIG. 8 illustrates a computer system that is arranged in a point-to-point (PtP) configuration. In particular, FIG. 8 shows a system where processors, memory, and input/output devices are interconnected by a number of point-to-point interfaces.

The system of FIG. 8 may also include several processors, of which only two, processors 870, 880 are shown for clarity. Processors 870, 880 may each include a processor core 874, 884, a local memory controller hub (MCH) 872, 882 to connect with memory 82, 84. Processors 870, 880 may exchange data via a point-to-point (PtP) interface 850 using PtP interface circuits 878, 888. Processors 870, 880 may each exchange data with a chipset 890 via individual PtP interfaces 852, 854 using point to point interface circuits 876, 894, 886, 898. Chipset 890 may also exchange data with a high-performance graphics circuit 838 via OF 892 and a high-performance graphics interface 839, and I/O devices 814 via OF 896 and interface 816, and keyboard/mouse 822, comm. devices 826, audio I/O 824 and data storage 828 including code 830 via bus bridge 818 and interface 820. Embodiments of the invention may be located within any processor having any number of processing cores, or within each of the PtP bus agents of FIG. 8.

Other embodiments of the invention, however, may exist in other circuits, logic units, or devices within the system of FIG. 8. Furthermore, in other embodiments of the invention may be distributed throughout several circuits, logic units, or devices illustrated in FIG. 8.

Processors referred to herein, or any other component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these mediums may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may be making copies of an article, e.g., a carrier wave, embodying techniques of the present invention.

Thus, techniques for steering memory accesses, such as loads or stores are disclosed. While certain embodiments have been described, and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Various aspects of one or more embodiments of the invention may be described, discussed, or otherwise referred to in an advertisement for a processor or computer system in which one or more embodiments of the invention may be used. Such advertisements may include, but are not limited to news print, magazines, billboards, or other paper or otherwise tangible media. In particular, various aspects of one or more embodiments of the invention may be advertised on the internet via websites, "pop-up" advertisements, or other web-based media, whether or not a server hosting the program to generate the website or pop-up is located in the United States of America or its territories.

What is claimed is:

1. A processor comprising:
    a prediction unit to predict whether a load operation to load data from a memory address will conflict with an older pending store operation to store data to the memory address;
    a watchdog unit to disable the prediction unit if the prediction unit mispredicts whether the load operation will conflict with the older pending store operation based on a ratio of a first counter value and a second counter value reaching a threshold value, wherein the first counter corresponds to a watchdog disambiguation counter to be incremented in a response to correct predictions and the second counter corresponds to a flush counter that is to be decremented in response to misprediction of whether load operations and store operations will conflict with each other.

2. The processor of claim 1, wherein the prediction unit includes a plurality of predictor table entries, each including a saturation counter to record a history of previous conflicts between loads and stores corresponding to the same target address.

3. The processor of claim 1, further comprising a reservation station from which to issue a second load operation to load data from a second memory address before issuing a second store operation to store data to the second memory address, the second store operation preceding the second load operation in program order.

4. The processor of claim 1, further comprising a load buffer to store a plurality of loads until their target addresses are determined, wherein each entry of the load buffer includes a memory disambiguation allowed (MDA) bit storage area to store an MDA bit to indicate whether a corresponding load is to be issued to a corresponding memory address before older pending stores to a same corresponding memory address.

5. The processor of claim 4, wherein each load buffer entry further comprises a memory disambiguation done (MDD) bit storage area to store an MDD bit to indicate whether the corresponding load was issued to the corresponding memory address before older pending stores to the same corresponding memory address.

6. The processor of claim 5, wherein each load buffer entry further comprises a memory disambiguation update (MDU) bit storage area to store an MDU bit to indicate whether a corresponding prediction table entry is to be updated.

7. The processor of claim 6, wherein each load buffer entry further comprises a memory disambiguation reset (MDR) bit storage area to store an MDR bit to indicate whether a corresponding prediction table entry is to be reset.

8. The processor of claim 7 further comprising a store buffer to store a plurality of stores until their target addresses are determined, and to store a load color to indicate an oldest load in the load buffer that is younger than a particular store in the store buffer.

9. The processor of claim 8, wherein the load buffer is to store a store color to indicate a youngest store in the store buffer that is older than a particular load in the load buffer.

10. An apparatus comprising:
a watchdog unit to disable some memory disambiguation (MD) logic if the MD logic causes a maximum rate of mispredictions of whether load operations from a first memory address and store operations to the first memory address will conflict with each other; and
a watchdog disambiguation counter to be incremented in response to correct predictions of whether the load operations and the store operations will conflict with each other, wherein the MD logic is to be disabled if a ratio of a value of the watchdog disambiguation counter and a flush counter value of a flush counter reaches a negative value.

11. The apparatus of claim 10, wherein said flush counter is to be decremented in response to mispredictions of whether the load operations and the store operations will conflict with each other.

12. The apparatus of claim 11, wherein said watchdog disambiguation counter is to be incremented in response to correct predictions of whether the load operations and the store operations will not conflict with each other.

13. The apparatus of claim 12, wherein the MD logic is to be enabled if the value of the watchdog disambiguation counter reaches a saturation value.

14. The apparatus of claim 10 wherein the watchdog unit is to enable the MD logic if the MD logic causes a minimum rate of correct predictions of whether the load operations from the first memory address and store operations to the first memory address will not conflict with each other.

15. The apparatus of claim 14, wherein the flush counter is to be incremented if incrementing the watchdog disambiguation counter generates a carry-out value.

16. The apparatus of claim 15 wherein the watchdog unit comprises a state machine having at least an active state and a disabled state, wherein a negative value in the flush counter is to cause the state machine to transition from the active state to the disabled state.

17. The apparatus of claim 16 wherein the state machine is to transition from the disabled state to the active state if a minimum number of non-conflicted loads are satisfied before any corresponding older store operations.

* * * * *